(12) United States Patent
Cheng (10) Patent No.: US 9,333,452 B2
(45) Date of Patent: May 10, 2016

(54) FILTER CARTRIDGE STRUCTURE HAVING HIGH EFFICIENCY PARTICULATE AIR FILTER (HEPA) OF DUST COLLECTOR

(71) Applicant: SAN FORD MACHINERY CO., LTD., Taichung (TW)

(72) Inventor: Chieh-Yuan Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 119 days.

(21) Appl. No.: 14/476,257

(22) Filed: Sep. 3, 2014

(65) Prior Publication Data

US 2016/0059169 A1 Mar. 3, 2016

(51) Int. Cl.
*B01D 46/00* (2006.01)
*B01D 50/00* (2006.01)

(52) U.S. Cl.
CPC ........ *B01D 46/0023* (2013.01); *B01D 46/0002* (2013.01); *B01D 46/0004* (2013.01); *B01D 46/0005* (2013.01); *B01D 50/002* (2013.01)

(58) Field of Classification Search
CPC .......... B01D 46/0002; B01D 46/0004; B01D 46/0005; B01D 46/0019; B01D 46/0023; B01D 46/2411; B01D 50/002
See application file for complete search history.

(56) References Cited

U.S. PATENT DOCUMENTS

2008/0190082 A1* 8/2008 Scott .................. B01D 46/0005
55/520

* cited by examiner

*Primary Examiner* — Robert Clemente
(74) *Attorney, Agent, or Firm* — Ming Chow; Sinorica, LLC (57) ABSTRACT

A filter cartridge structure having a high efficiency particulate air filter (HEPA) is mounted to a dust collector and includes a filtration unit. A cover is fitted on the filtration unit. The circumferential side of the cover has at least one opening. A high efficiency particulate filter is provided at the opening. When in use, the filtration unit is to filter dust and fines to carry out a first filtration. The high efficiency particulate filter is to filter motes and particulates which may jeopardize the human body. The present invention can filter the dust/fines and the motes/particulates effectively to provide better air quality and a safe working environment.

8 Claims, 7 Drawing Sheets

FILTER CARTRIDGE STRUCTURE HAVING HIGH EFFICIENCY PARTICULATE AIR FILTER (HEPA) OF DUST COLLECTOR

BACKGROUND OF THE INVENTION

1. Field of the Invention

The present invention relates to a filter cartridge structure of a dust collector, and more particularly to a filter cartridge structure having a high efficiency particulate air filter (HEPA) of a dust collector.

2. Description of the Prior Art

Figure 1:
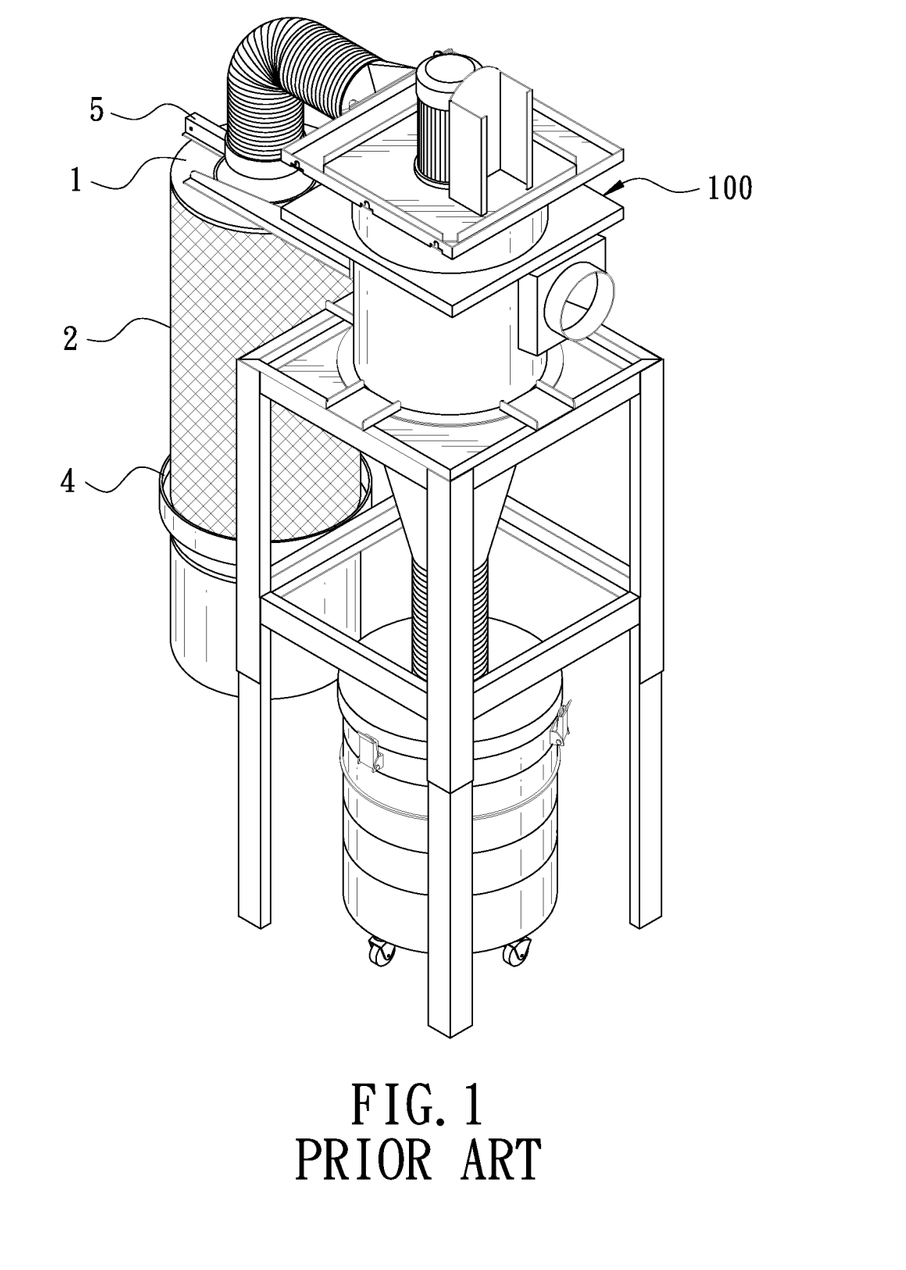
FIG. 1 is a perspective view of a conventional dust collector with a filter cartridge structure.
Figure 2:
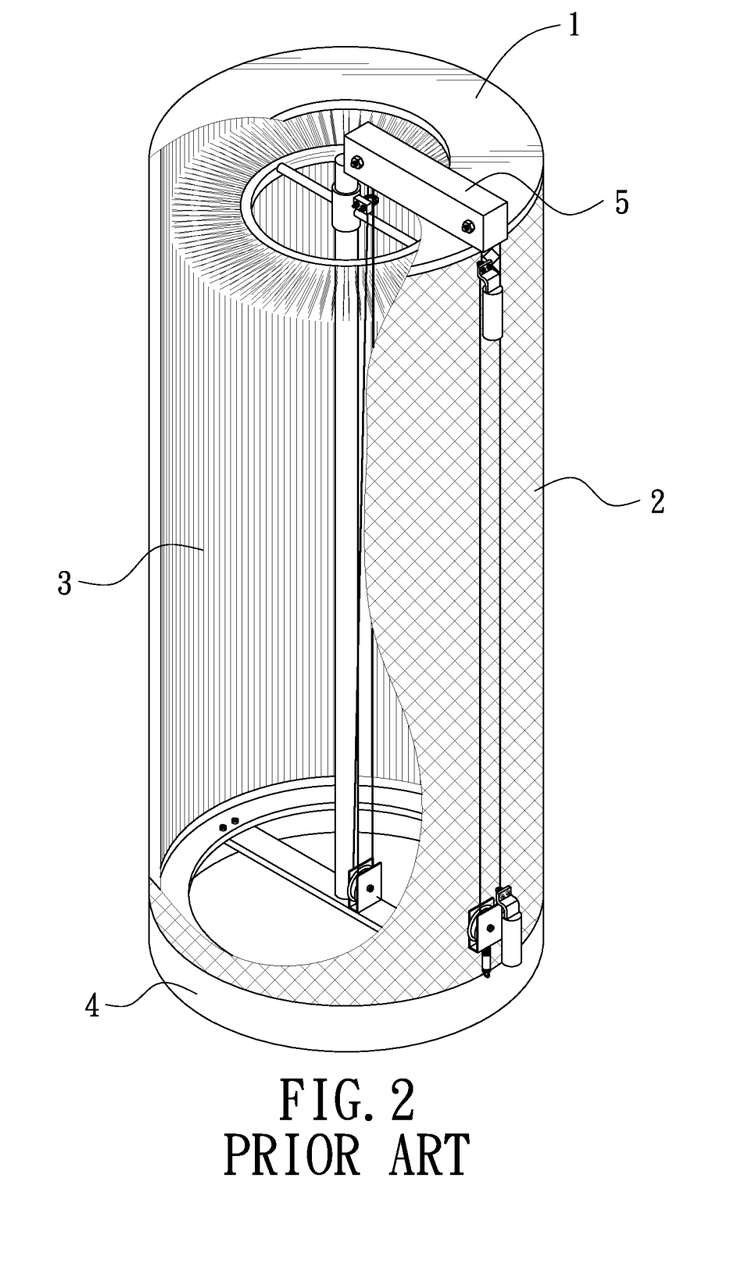
FIG. 2 is a perspective view of the filter cartridge structure of the conventional dust collector.

In a processing place, the process will produce a lot of dust or fines, so the person in this working environment can not breathe clean air. Therefore, a filter cartridge for a dust collector is developed. The filter cartridge is mounted to a dust collector to purify the air. FIG. 1 is a perspective view of a conventional dust collector with a filter cartridge structure. The filter cartridge structure comprises a dust collection cylinder 1. The dust collection cylinder 1 has an outer frame 2. A filter 3 is provided in the outer frame 2. The bottom of the outer frame 2 is provided with a base 4. The outer side of the dust collection cylinder 1 is provided with a cleaning device 5. The cleaning device 5 is adapted to clean the dust and fines on the filter 3.

The cleaning device 5 of the above-mentioned dust collector can clean the dust and fines quickly. But, after the dust collection cylinder 3 is used for a period of time, the filtration effect of the filter 3 will become worse. Besides, the filter 3 is unable to filter the particulates of the dust and fines, which causes that the particulates are scattered in the air. Therefore, a high efficiency particulate air filter instead of the filter is developed. However, the high efficiency particulate air filter is fragile. If the cleaning device 5 is used to clean the high efficiency particulate air filter, the high efficiency particulate air filter may be damaged. Accordingly, the inventor of the present invention has devoted himself based on his many years of practical experiences to solve these problems.

SUMMARY OF THE INVENTION

The primary object of the present invention is to provide a filter cartridge structure having a high efficiency particulate air filter (HEPA) of a dust collector. By using the high efficiency particulate air filter to filter motes and particulates of dust and fines and to lower the motes and particulates from scattering in the air greatly. The filter cartridge structure having the high efficiency particulate air filter (HEPA) is mounted at the air outlet of the dust collector, and comprises a filtration unit, a cover, and at least one high efficiency particulate filter. The filtration unit has a casing. The casing has an accommodation room therein and a through hole above the accommodation room to communicate with the air outlet of the dust collector. The circumferential wall of the casing is formed with a plurality of through apertures. A filter is provided in the accommodation room of the casing. The filter is adapted to filter dust and fines. The cover is fitted on the filtration unit to seal the filtration unit. The circumferential side of the cover has at least one opening. The high efficiency particulate filter is disposed at the opening. The high efficiency particulate filter is adapted to filter motes and particulates of the dust and fines.

The filtration unit is disposed in the cover. The cover is in an airtight state. The opening at the circumferential side of the cover is provided with the high efficiency particulate filter. When in use, the filter is to adapted filter the dust to carry out a first filtration. After the first filtration, the dust still has motes and particulates which may jeopardize the human body. The high efficiency particulate filter is to carry out a second filtration. Through the filtration unit and the high efficiency particulate filter, the present invention can filter the dust/fines and the motes/particulates effectively and has a better filtration effect to provide better air quality.

DETAILED DESCRIPTION OF THE PREFERRED EMBODIMENTS

Embodiments of the present invention will now be described, by way of example only, with reference to the accompanying drawings.

Figure 3:
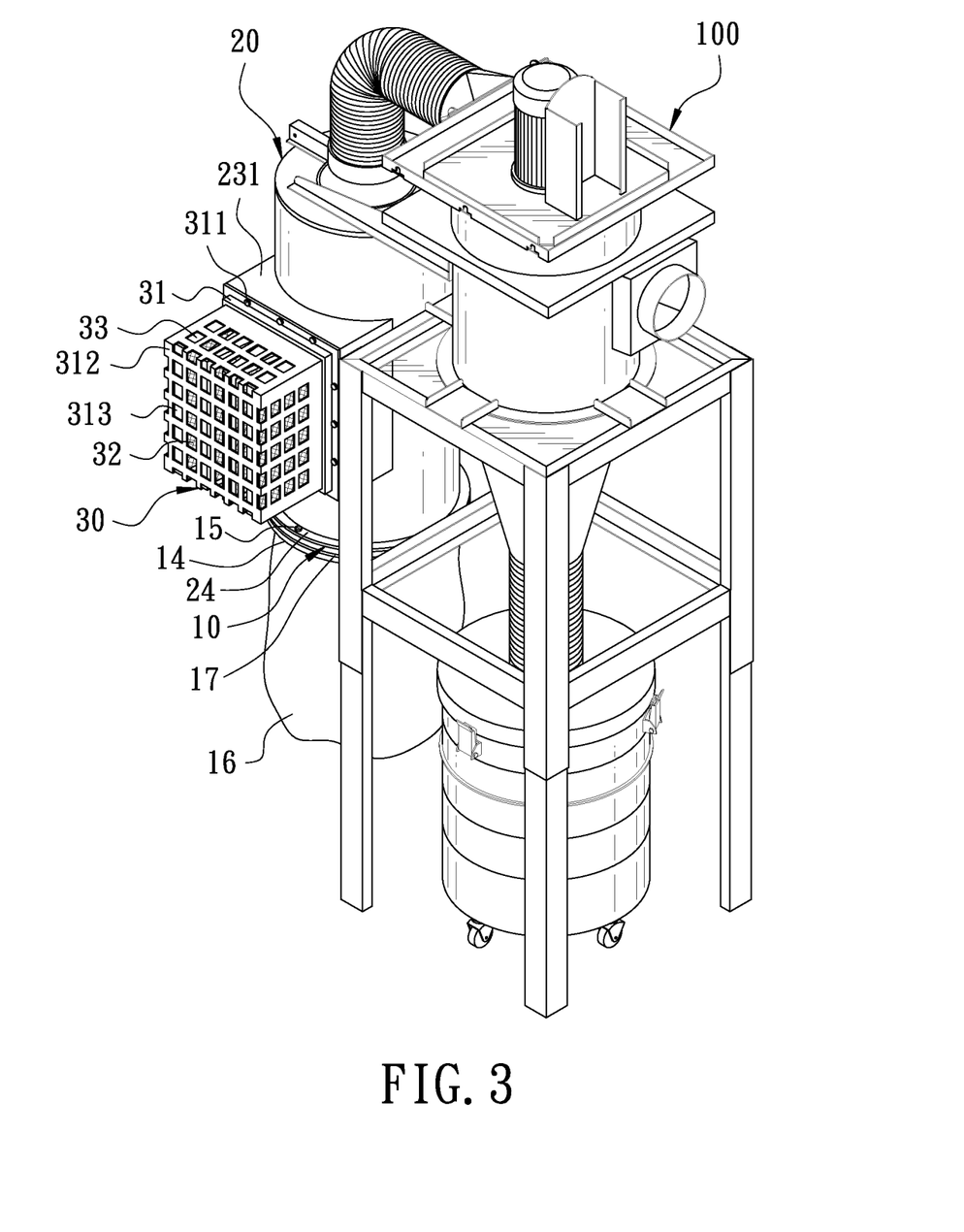
FIG. 3 is a perspective view of a first embodiment of the present invention cooperated with a dust corrector.
Figure 4:
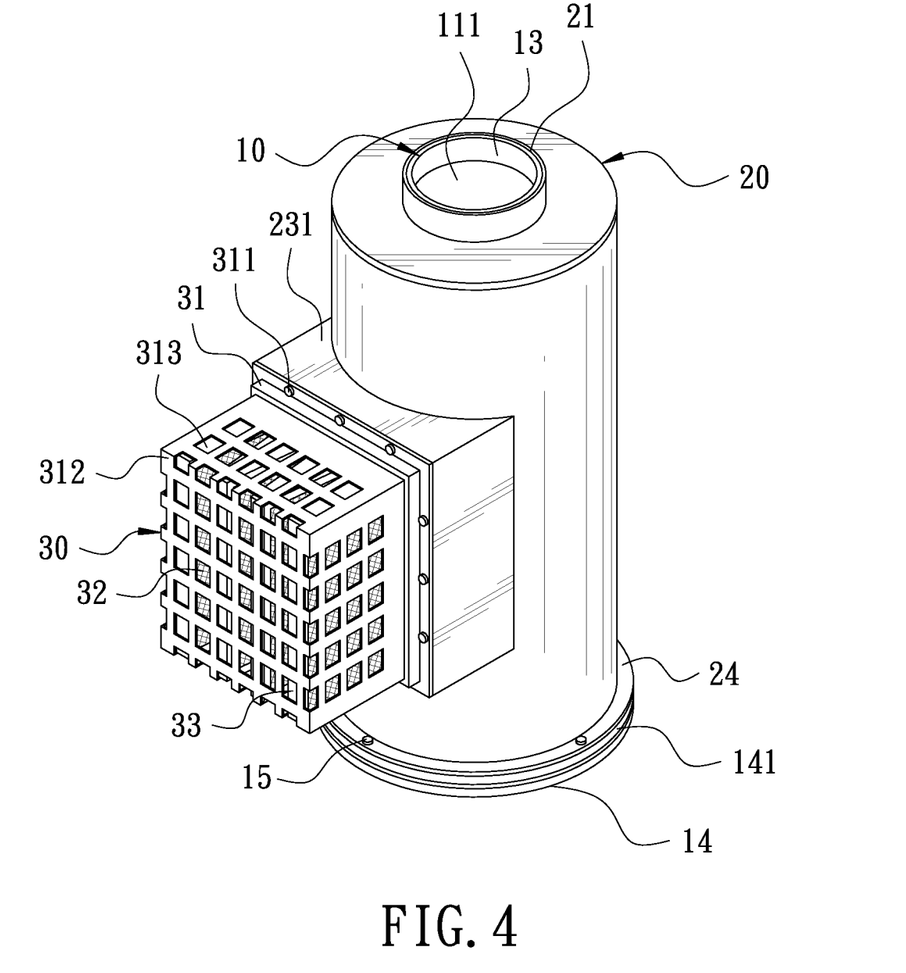
FIG. 4 is a perspective view of the first embodiment of the present invention.
Figure 5:
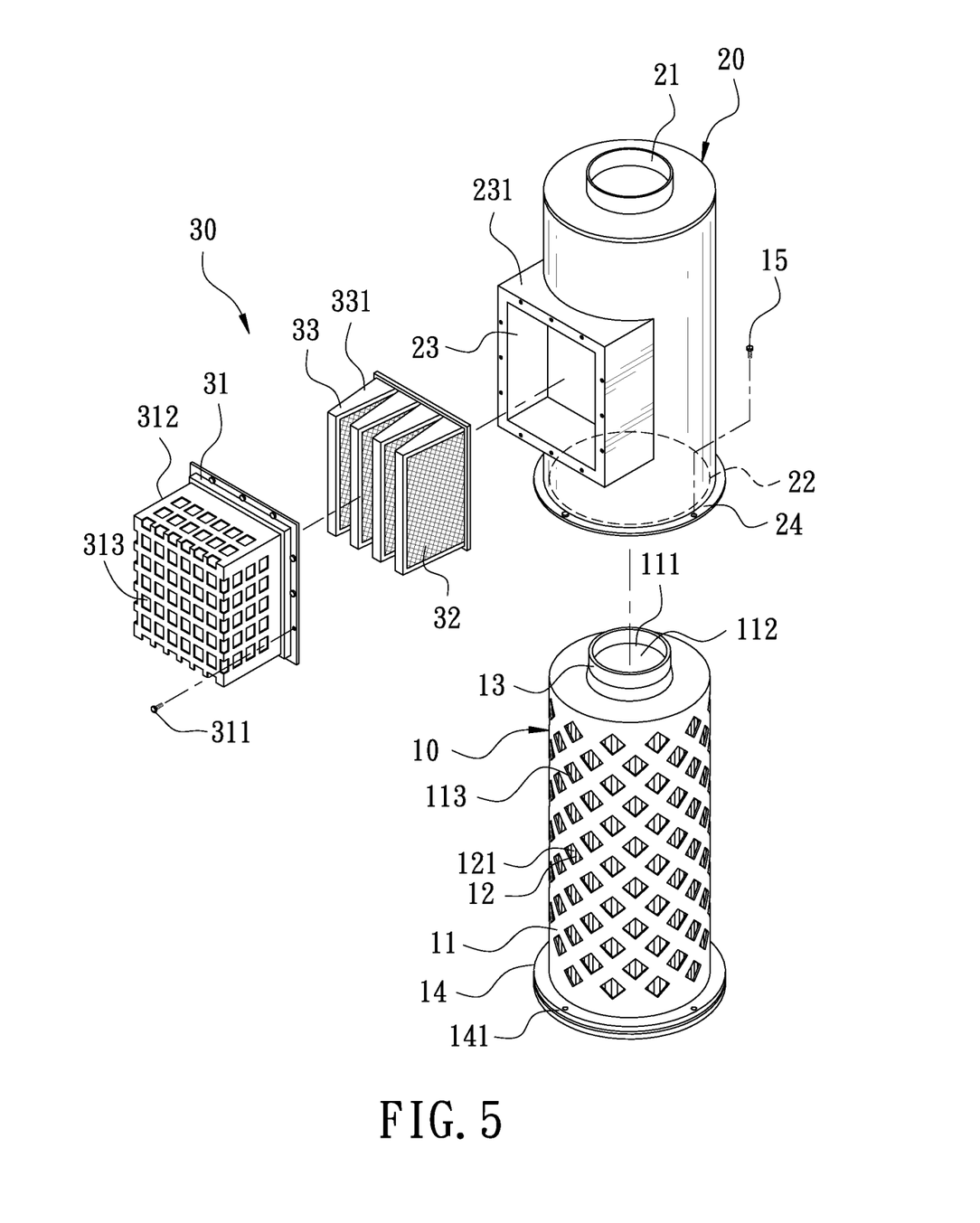
FIG. 5 is an exploded view of the first embodiment of the present invention.

FIG. 3 is a perspective view of a first embodiment of the present invention cooperated with a dust corrector. The present invention discloses a filter cartridge structure having a high efficiency particulate air filter (HEPA) of a dust collector. The filter cartridge structure having the high efficiency particulate air filter (HEPA) is mounted at the air outlet of a dust collector 100. FIG. 4 is a perspective view of the first embodiment of the present invention. FIG. 5 is an exploded view of the first embodiment of the present invention. The filter cartridge structure having the high efficiency particulate air filter (HEPA) comprises a filtration unit 10, a cover 20, and at least one high efficiency particulate filter 30.

The filtration unit 10 has a casing 11. The casing 11 has a cylinder shape. The casing 11 has an accommodation room 111 therein and a through hole 112 above the accommodation room 111 to communicate with the air outlet of the dust collector. The circumferential wall of the casing 11 is formed with a plurality of through apertures 113. A filter 12 is provided in the accommodation room 111 of the casing 11. The top of the casing 11 is formed with a connecting pipe 13 corresponding in position to the through hole 112. The connecting pipe 13 is connected to the dust collector 100. The filter 12 is made of a paper material and has a tubular shape. The inner wall of the filter 12 is formed with a plurality of toothed bending wall edges 121. The filter 12 is used to filter dust and fines. The bottom of the casing 11 is formed with a connecting seat 14. The connecting seat 14 has a central hollow portion to communicate with the casing 11. The connecting seat 14 has a stop flange 141 around an outer wall thereof. In this embodiment, the connecting seat 14 is adapted to connect a dust collection bag 16. The dust collection bag 16 is fixed to the connecting seat 14 through a fastening ring 17.

The cover 20 is fitted on the filtration unit 10. The center of the top of the cover 20 has an air inlet 21. The bottom of the cover 20 has a connecting mouth 22. The circumferential side of the cover 20 has at least one opening 23 and a coupling flange 231 extending outwardly from the circumferential edge of the opening 23. The cover 20 has a connecting flange 24 around the circumferential wall of the bottom of the cover 20. The connecting flange 24 and the stop flange 141 are connected and fixed by a plurality of bolts 15. In this embodiment, the coupling flange 231 protrudes from the circumferential side of the cover 20 and has a hollow rectangular shape.

The high efficiency particulate filter 30 is adapted to cover the opening 23 and has a frame 31. The frame 31 is provided with a fixing lid 33. The fixing lid 33 is provided with a net member 32 therein. The frame 31 is connected to the coupling flange 231. In this embodiment, the frame 31 has a rectangular shape corresponding to the coupling flange 231. The frame 31 and the coupling flange 231 are connected and fixed by a plurality of bolts 311, such that the fixing lid 33 is limited at the opening 23 and the net member 32 is located at the opening 23. The frame 31 comprises a protection cover 312 extending outwardly. The outer circumferential side of the protection cover 312 of the frame 31 is formed with a plurality of holes 313. The fixing lid 33 is located in the protection cover 312. The fixing lid 33 has a plurality of hollow fixing portions 331 which are arranged at an interval. The net member 32 of the high efficiency particulate filter 30 is a multi-bended net to filter motes and particulates of the dust and fines.

FIG. 3 is a perspective view of the first embodiment of the present invention cooperated with a dust corrector. FIG. 5 is an exploded view of the first embodiment of the present invention. The filtration unit 10 is disposed in the cover 20. The cover 20 is in an airtight state. The outer side of the cover 20 is provided with the high efficiency particulate filter 30. When in use, the dust collector 100 is used to collect the dust or fines generated by processing to carry out a first filtration. The heavy dust and fines are filtered by the dust collector 100 and collected in the dust collector 100. After that, the light dust and fines are delivered to the accommodation room 111 of the casing 11. The filter 12 is to carry out a second filtration for the dust and fines. The dust and fines are attached to the filter 12. In addition, the heavier materials of the dust and fines are collected in the dust collection bag 16. However, the filter 12 is unable to filter the mote or particulates of the dust or fines. The mote or particulates will pass the filter 12 and the through apertures 113 of the casing 11 to be exhausted from the opening 23 of the cover 20. Referring to FIG. 4, the opening 23 at the coupling flange 231 is provided with the high efficiency particulate filter 30. The high efficiency particulate filter 30 has the net member 32. The net member 32 is adapted to filter the mote or particulates. Through the fixing portions 331, the high efficiency particulate filter 30 is in the form of multi-bended, so that the net member 32 has a larger filtration area and a better filtration effect. Therefore, the present invention can filter the dust and fines effectively to provide better air quality.

Figure 6:
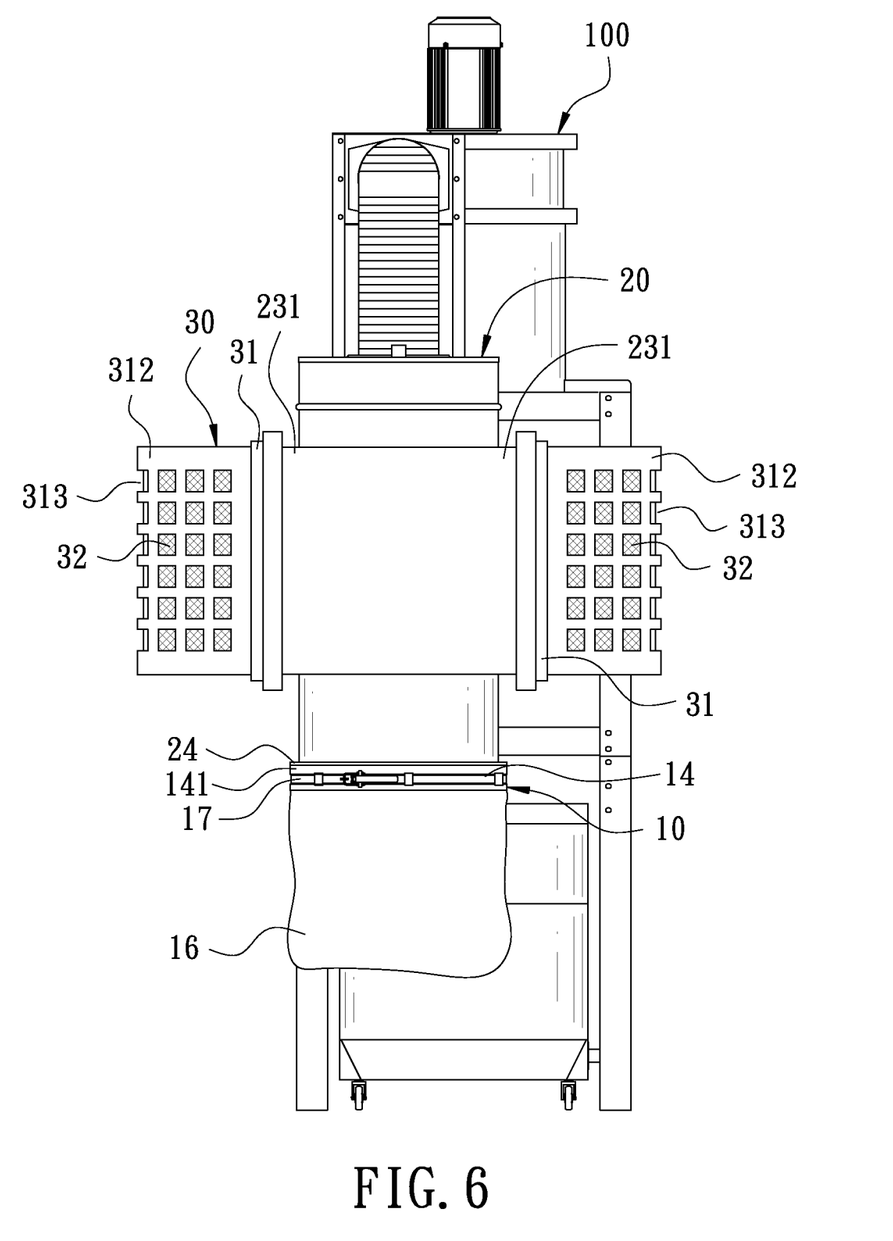
FIG. 6 is a front view of a second embodiment of the present invention.

FIG. 6 is a front view of a second embodiment of the present invention. The second embodiment is substantially similar to the first embodiment with the exceptions described hereinafter. The cover 20 has two coupling flanges 231. The coupling flanges 231 are disposed oppositely. The coupling flanges 231 are provided with the high efficiency particulate filters 30, respectively. Through the coupling flanges 231 and the high efficiency particulate filters 30, the present invention can enhance the efficiency to filter the mote or particulates of the dust or fines.

Figure 7:
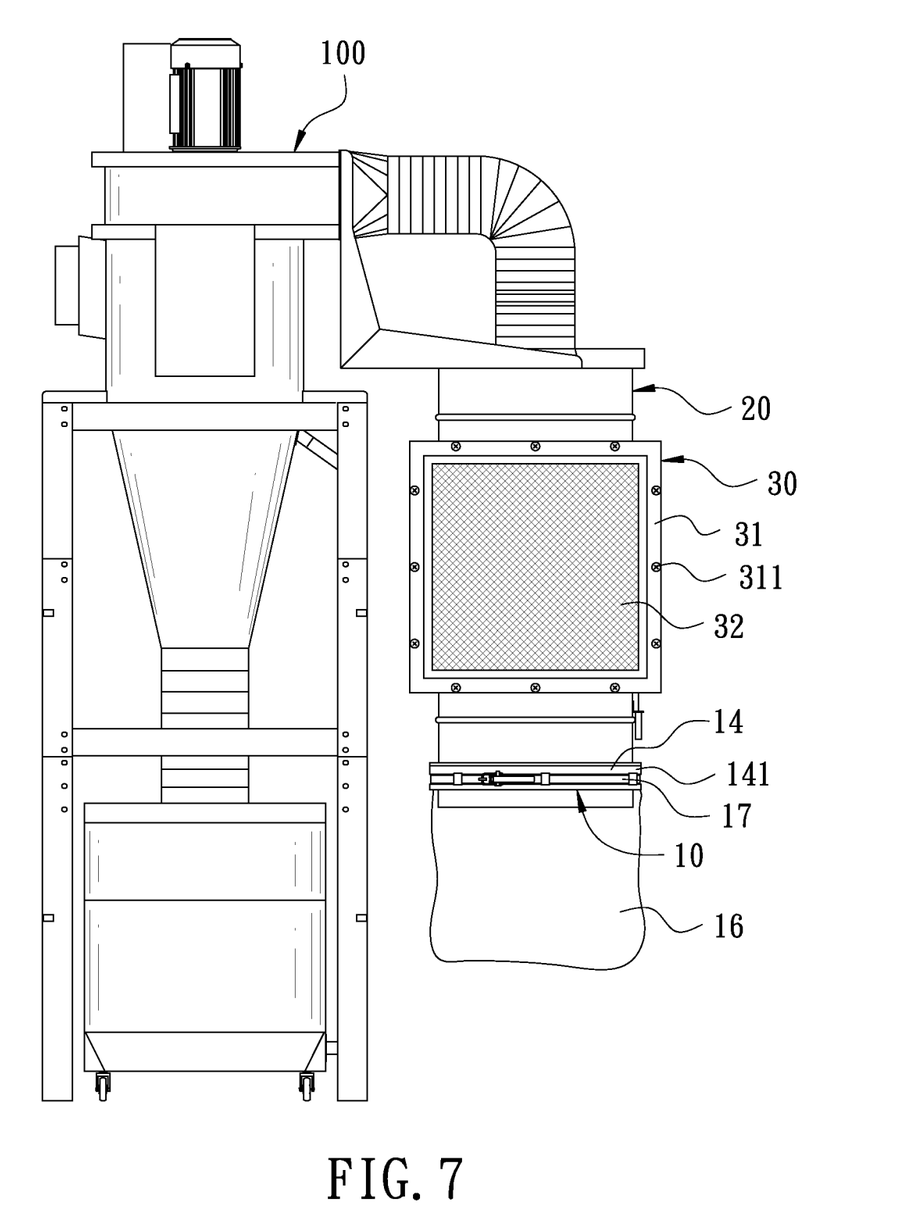
FIG. 7 is a front view of a third embodiment of the present invention.

FIG. 7 is a front view of a third embodiment of the present invention. The third embodiment is substantially similar to the first embodiment with the exceptions described hereinafter. The high efficiency particulate filter 30 has the net member 32 disposed on the frame 31. The net member 32 has a flat plate shape, and is flush with the frame 31. When in use, this embodiment can achieve the same filtration effect like the first embodiment.

It is noted that the cover 20 and the casing 11 of the filtration unit 10 is provided with a cleaning device like the cover structure of the conventional dust collector for the user to clean the dust and fines on the filter 12 by using the cleaning device so as to enhance the practicality and convenience of the present invention.

It is noted that the frame 31 is provided with the protection cover 312. The protection cover 312 is formed with the holes 313. The protection cover 312 is fitted on the net member 32. Thus, the protection cover 312 of the present invention is used to protect the net member 32. The holes 313 are adapted for the air to flow out after filtration. The protection cover 312 can prevent a foreign object from hitting so as to protect the net member 32.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A filter cartridge structure having a high efficiency particulate air filter (HEPA) of a dust collector, mounted at an air outlet of the dust collector and comprising:
    a filtration unit, the filtration unit having a casing, the casing having an accommodation room therein and a through hole above the accommodation room to communicate with the air outlet of the dust collector, a circumferential wall of the casing being formed with a plurality of through apertures, a filter being provided in the accommodation room of the casing, the filter being adapted to filter dust and fines;
    a cover, the cover being fitted on the filtration unit to seal the filtration unit, a circumferential side of the cover having at least one opening; and
    at least one high efficiency particulate filter, the high efficiency particulate filter being disposed at the opening, the high efficiency particulate filter being adapted to filter motes and particulates of the dust and fines.

2. The filter cartridge structure having a high efficiency particulate air filter (HEPA) of a dust collector as claimed in claim 1, wherein the cover has a coupling flange extending outwardly from a circumferential edge of the opening, the high efficiency particulate filter having a frame, the frame being provided with a fixing lid, the fixing lid being provided with a net member therein, the frame and the coupling flange being connected by a plurality of bolts.

3. The filter cartridge structure having a high efficiency particulate air filter (HEPA) of a dust collector as claimed in claim 2, wherein the fixing lid has a plurality of hollow fixing portions which are arranged at an interval, the fixing portions being provided with the net member, the net member of the high efficiency particulate filter being a multi-bended net.

4. The filter cartridge structure having a high efficiency particulate air filter (HEPA) of a dust collector as claimed in claim 2, wherein the net member of the high efficiency particulate filter has a flat plate shape and is flush with the frame.

5. The filter cartridge structure having a high efficiency particulate air filter (HEPA) of a dust collector as claimed in claim 2, wherein the coupling flange of the cover has a hollow rectangular shape, the frame having a rectangular shape corresponding to the coupling flange, the frame being coupled to the coupling flange so that the fixing lid is limited at the opening.

6. The filter cartridge structure having a high efficiency particulate air filter (HEPA) of a dust collector as claimed in claim 2, wherein the frame comprises a protection cover extending outwardly, an outer circumferential side of the protection cover of the frame being formed with a plurality of holes, the protection cover being adapted to cover the net member.

7. The filter cartridge structure having a high efficiency particulate air filter (HEPA) of a dust collector as claimed in claim 1, wherein the cover has a connecting flange around a circumferential wall of a bottom of the cover.

8. The filter cartridge structure having a high efficiency particulate air filter (HEPA) of a dust collector as claimed in claim 7, wherein a bottom of the casing is formed with a connecting seat, the connecting seat having a central hollow portion to communicate with the accommodation room, the connecting seat having a stop flange around an outer wall thereof, the stop flange and the connecting flange being connected by a plurality of bolts.

* * * * *